United States Patent [19]

Brunner

[11] Patent Number: 4,594,056
[45] Date of Patent: Jun. 10, 1986

[54] HYDRAULIC PUMP UNIT

[75] Inventor: Rudolf Brunner, Baldham, Fed. Rep. of Germany

[73] Assignee: Heilmeier & Weinlein, Fabrik fur Oel-Hydraulik GmbH & Co., KG, Munich, Fed. Rep. of Germany

[21] Appl. No.: 185,274

[22] Filed: Sep. 8, 1980

[30] Foreign Application Priority Data

Sep. 11, 1979 [DE] Fed. Rep. of Germany ....... 2936669

[51] Int. Cl.⁴ ...................... F04B 27/04; F04B 35/04; H02K 15/00
[52] U.S. Cl. .................... 417/271; 417/273; 417/360; 417/366; 417/419; 310/42; 310/89; 222/385
[58] Field of Search ............... 417/360, 269, 271, 273, 417/366, 419, 415; 310/89, 271, 91, 42, 254, 268; 29/596; 222/333, 385

[56] References Cited

U.S. PATENT DOCUMENTS

| | | | |
|---|---|---|---|
| 2,413,546 | 12/1946 | Curtis et al. | 222/333 |
| 2,447,645 | 8/1946 | Goodwin et al. | 310/254 |
| 2,505,854 | 5/1950 | Curzon | 310/89 |
| 3,034,443 | 5/1962 | Hinrichs et al. | 417/360 |
| 3,586,456 | 6/1971 | Giacossa | 417/372 |
| 3,847,330 | 11/1974 | Morrison | 248/14 |
| 3,870,908 | 3/1975 | Button et al. | 310/89 |
| 3,922,114 | 11/1975 | Hamilton et al. | 417/366 |
| 4,118,644 | 10/1978 | Schulte et al. | 310/89 |

Primary Examiner—Cornelius J. Husar
Assistant Examiner—Peter M. Cuomo
Attorney, Agent, or Firm—Kinzer, Plyer, Dorn & McEachran

[57] ABSTRACT

A hydraulic pump unit, comprising an electric motor, the stator (5) of which is disposed in a housing defining an oil reservoir and the rotor of which is mounted on a shaft which drives a hydraulic pump. Each front end of said stator is associated with an end shield for a shaft bearing. A pump element or the pump is secured to at least one end shield. Elongated connecting members which are distributed about said shaft in the circumferential direction support said end shields. The connecting members are designed as rods (17), abut against the outer circumference (7) of said stator (5) and, in the undeformed state, guide said stator in a close sliding fit. At least one tightening strap (19) encompasses said rods (17) and the outer stator circumference (7) for deforming said rods (17) until said stator is fixed in position and for pressing said rods against the stator circumference. A means for preventing rotation can be provided between said stator and said rods or said tightening strap. At least one end shield can form one portion of the hydraulic reservoir and, if desired, can contain channels.

7 Claims, 6 Drawing Figures

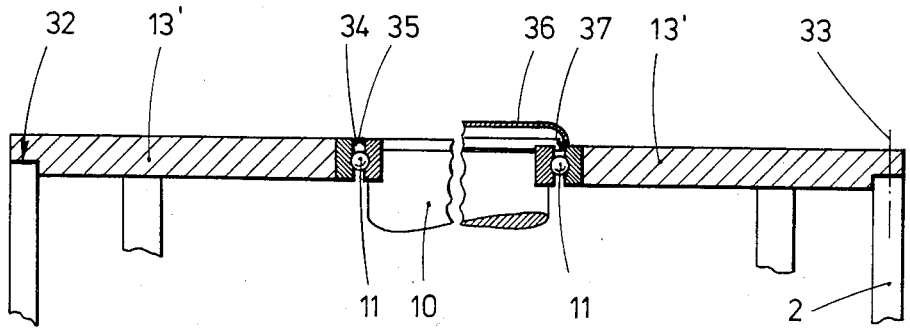

HYDRAULIC PUMP UNIT

BACKGROUND OF THE INVENTION

This invention relates to a hydraulic pump unit of the type set forth in the preamble of the main patent claim.

DESCRIPTION OF THE PRIOR ART

In the pump unit known from German patent specification No. 660,673, the connecting members are elongated tightening screws which extend through appropriately disposed longitudinal holes in the stator and which press the end shields at both front ends of the stator onto the same. This is the conventional construction of an electric motor in which the end shields contain the shaft bearings. This is necessary in order to provide appropriate longitudinal holes in the stator and to design the end shields such that they ensure reliable, proper, non-rotatable positioning of the stator when these end shields press against the same. To prevent the longitudinal pressure exerted by the end shields from being transferred directly to the stator body, this is surrounded on its outer circumference with an annular housing which supports the edges of the end shields. The end shields themselves are usually complicated cast parts and are expensive to manufacture. It is also expensive to provide the longitudinal holes in the stator.

A similar pump unit is also known from German laying-open print DE-OS No. 2,633,415. In this case the hydraulic pump assembly is mounted in the hydraulic housing in a non-rotatable manner and has upwardly projecting attachment bases—distributed in the circumferential direction about a shaft bearing which is integral to the pump housing—on which the front face of the stator of the electric motor is mounted. Tightening bolts are inserted through appropriately designed longitudinal holes in the stator and screwed into the support base. At the head end of the tightening bolts, spacers are provided thereupon and an end shield, in turn, abuts on said spacer and has an upper central shaft bearing. The tightening bolts thus press the end shield onto the spacers which in turn press the stator onto the support base. The longitudinal holes must be provided in the stator in this embodiment as well. Moreover, the electric motor can be installed only in combination with the appropriately designed pump housing.

There is substantial correlation between the construction of the electric motor and the pump housing or the pump itself in both of these known solutions. This means that in particular the electric motor to be used must be especially designed and constructed for this purpose. The use of a standard motor or the selective interchange or replacement of either the electric motor or the pump housing is not possible in this case.

A pamphlet (No. 7200, April 1978) from the company Heilmeier & Weinlein reveals hydraulic pump units which can be submersed in customer-furnished oil reservoirs. The standard motor is encapsulated in a multipart cast housing which contains the bearings for the rotor shaft and which is supplemented by a connecting plate on which the requisite number of pump elements are attached. The drawback of this known design is that the standard motor in the oil reservoir has its own housing which is expensive, heavy and also takes up a disproportionate amount of space owing to the requisite cooling fins. In the latter case, the oil reservoir must have larger dimensions to contain the same amount of oil as the afore-mentioned pump unit in which the stator is shrink-fitted into the housing directly.

SUMMARY OF THE INVENTION

The object of the invention is to provide a hydraulic pump unit of the type cited at the outset which can be manufactured inexpensively and without sophisticated technical equipment.

The structure and manufacture of the pump unit are simplified for all intents and purposes; it also saves space and is low in weight. The manufacturing costs for such a unit are substantially lower than that of comparable units of the same size and performance. The only thing required to manufacture a unit is a commercial stator and rotor of a so-called standard motor; the other parts can be produced from commercially available materials. The rods, for example, are pieces of rod material which have been cut to length; the plates are produced from sheet metal in running meters; the tightening strap is commercially available in any desired length. A special advantage of this unit is that a simple and inexpensive hydraulic oil reservoir can be used which is supplied by the customer, since the reservoir has no function except to accommodate the oil. Moreover, repair work or the replacement of a damaged stator can be executed without difficulty. A special stator machining operation, e.g. providing the longitudinal holes which were hitherto common, is now superfluous.

A preferred embodiment of the invention is one in which the cage is formed in this way which is supported on the stator due to the action of the tightening strap so that the plates hold the bearings for the rotor shaft in exact alignment with the median longitudinal axis of the stator. This is especially favorable in that the stator of so-called standard motors is rounded off externally so that the circumferential surface thereof constitutes a cylindrical surface, the central axis of which conincides with the axis of the rotor shaft. The rods supporting the stator in a close sliding fit align the plate exactly with the median longitudinal axis of the stator; the tightening strap then fixes this position. While the strap is still loose, the stator can be slid back and forth on the rotor or rotor shaft. The holes which are intended to receive the ends of the rods only need be marked out in a partial circle which can be determined by measuring the external stator diameter and the rod diameter. The distribution of the rods along the outer circumference of the stator is of little importance; it is expedient, however, to attempt to distribute the rods symmetrically in order to attain uniform pressure.

Another embodiment concerns the instance when a plurality of pump elements driven by the rotor shaft is employed. The channels can be formed by holes which extend into the plate interior—a common measure in valve construction—and there have connections where the pump elements are attached or a collecting duct is connected. The pump elements can also be attached in a like manner to the second plates. Other hydraulic pumps, e.g. gear pumps, can be attached to the plates and driven in place of the pump elements which are normally equipped with a piston. Depending on the application, pump elements can even be provided on the one plate and a gear pump on the other plate.

In another embodiment a sheet metal housing can conform to the prevailing operating conditions. It does not have to fulfill any special requirements as far as stiffness or shape are concerned, since it serves exclusively to accommodate the hydraulic oil.

Under another embodiment the plate can be connected to the cover by means of simple screws which are screwed from the outside through the cover into the plate. The cover does not require a special shape for this purpose.

The total costs of the unit can be reduced if the plate serving to mount the rotor shaft and the rods simultaneously constitutes the cover of the oil reservoir.

Another embodiment is advisable to prevent the oil from being discharged from the reservoir in an uncontrolled manner and to ensure the lubrication of the bearing of the rotor shaft.

Another advantageous measure is to prevent the stator from rotating relative to the cage.

BRIEF DESCRIPTION OF THE DRAWINGS

Embodiments of the invention will now be explained in detail in the following with reference to the drawings, in which.

DESCRIPTION OF THE EMBODIMENTS

Figure 1:
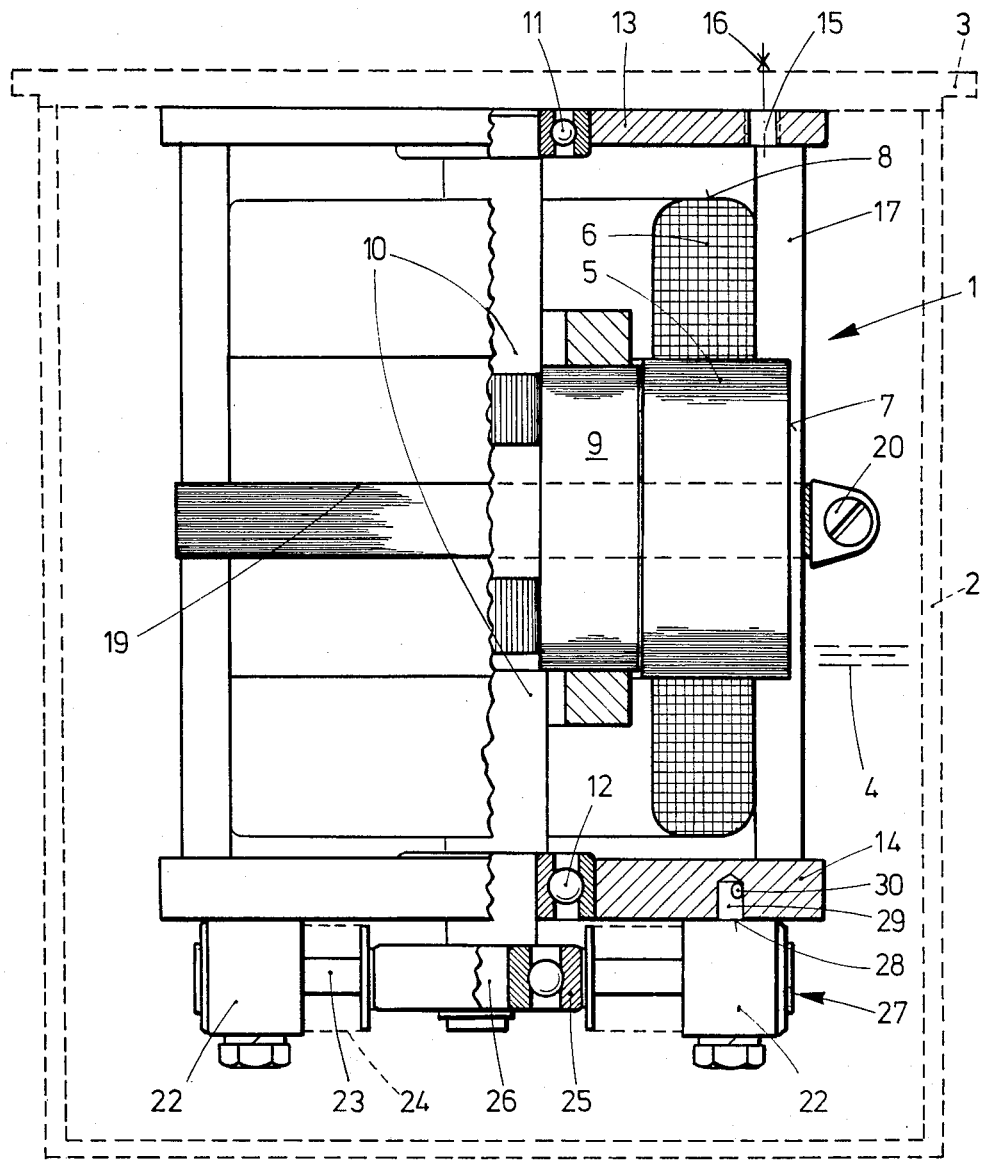
FIG. 1 is a partial longitudinal section through a hydraulic pump unit in an oil reservoir.
Figure 2:
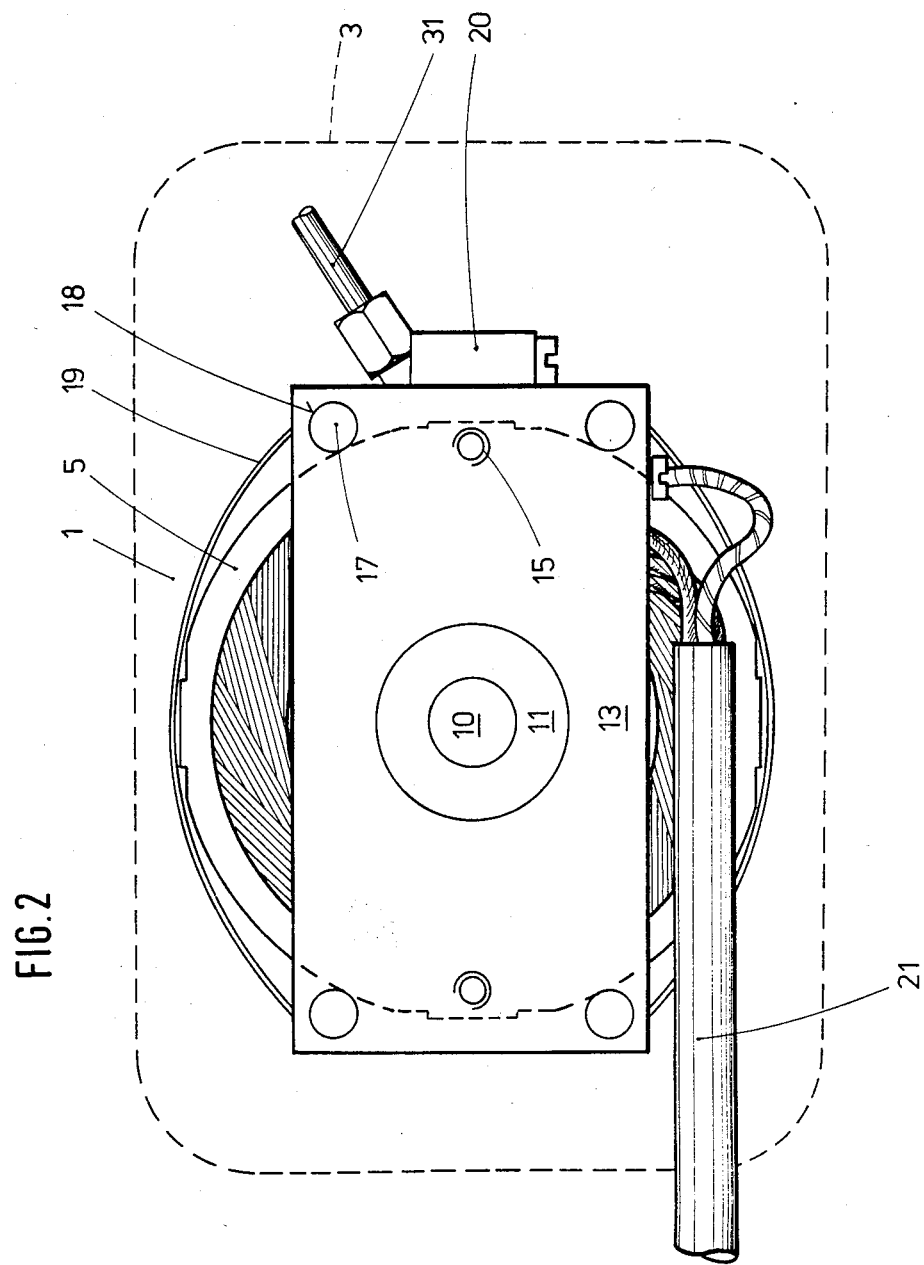
FIG. 2 is a top elevation of the pump unit in FIG. 1.
Figure 3:
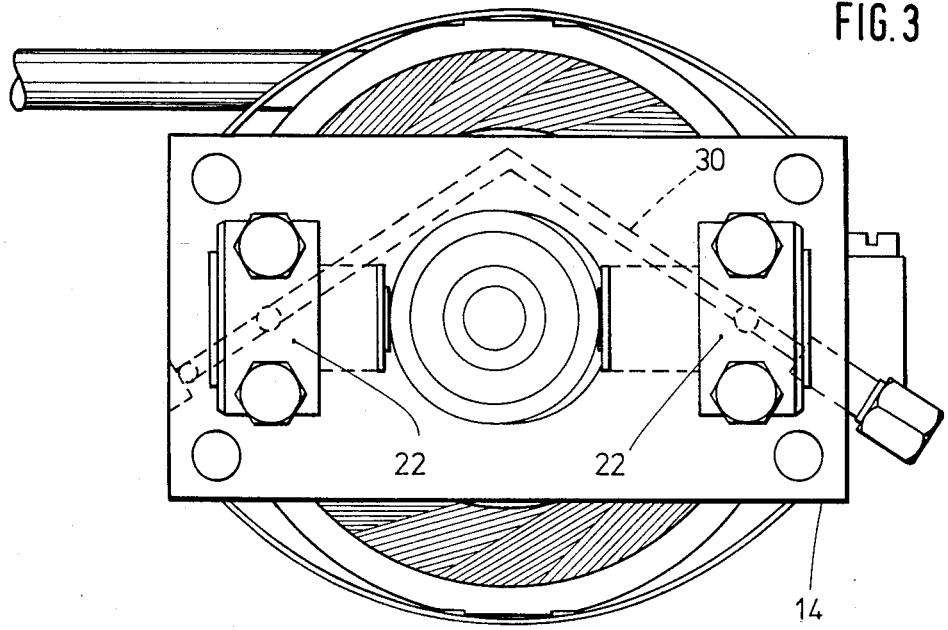
FIG. 3 is a bottom elevation of the pump unit in FIG. 1.

A hydraulic pump unit 1 is accommodated in FIGS. 1, 2 and 3 in an oil reservoir 2 which has the shape of a regular parallelopiped, which is closed at the top by a cover 3 and which contains hydraulic oil.

The pump unit consists of an electric motor of which only an annular stator 5 and a stator winding 6 are shown. The stator has an approximately cylindrical circumferential surface 7 on the outer side. The face ends of the stator are designated 8. A rotor 9 is rotatably disposed inside the stator 5 and is shrink-fitted to a rotor shaft 10 (incorporating two parts in this case). The rotor shaft 10 is mounted in roller bearings 11 and 12 in plates 13 and 14 which are located adjacent to said face ends 8 of the stator. The plate 13 is attached to the cover 3 of the reservoir 2 by means of fastening screws 16 and threaded holes 15.

Both plates 13 and 14 are firmly connected to one another by means of rods 17 whose ends are shrink-fitted into openings 18 in the corners of the plate. The rods 17 extend approximately parallel to the shaft 10 and abut against the outer circumference 7 of the stator 5, thereby making contact therewith. A tightening strap 19 is tensioned by a screw 20 to such an extent that the rods 17 are deformed and firmly pressed against the outer circumference 7 of the stator 5. The roller bearings 11 and 12 are thus permanently aligned with the shaft 10 via the rods 17, and the plates 13 and 14 are fixed in position.

In FIG. 2, one lead 21 of the electric cable to the unit 1 is shown.

It is evident in FIGS. 1 and 3 that two hydraulic pump elements 22 are secured to the underside of the plate 14 and are approximately diametrically opposed relative to the axis of the shaft 10. An actuating plunger 23 of each pump element 22 is pre-biased by a return spring 24 and extends up to the outer ring of another roller bearing 25 which is adapted to rotate on a stem 26 mounted eccentrically relative to the longitudinal axis of the shaft 10. The extent of eccentricity (FIG. 3) dictates the effective operating stroke for the pump elements 22.

Each pump element has a freely accessible suction port 27 (not shown in detail), while the discharge 28 thereof terminates directly in the plate 14 where channels 29 and 30 are located. These channels convey the pressurized hydraulic oil to a collecting duct 31 (FIG. 2).

The pump unit operates completely in the oil bath. The rotation of the rotor shaft 10 is transmitted via the eccentric rolling bearing 25, thereby actuating the pump elements 22 which suck oil from the oil bath and press the hydraulic oil under pressure through the channels 29 and 30 into the collecting duct 31.

Figure 4:
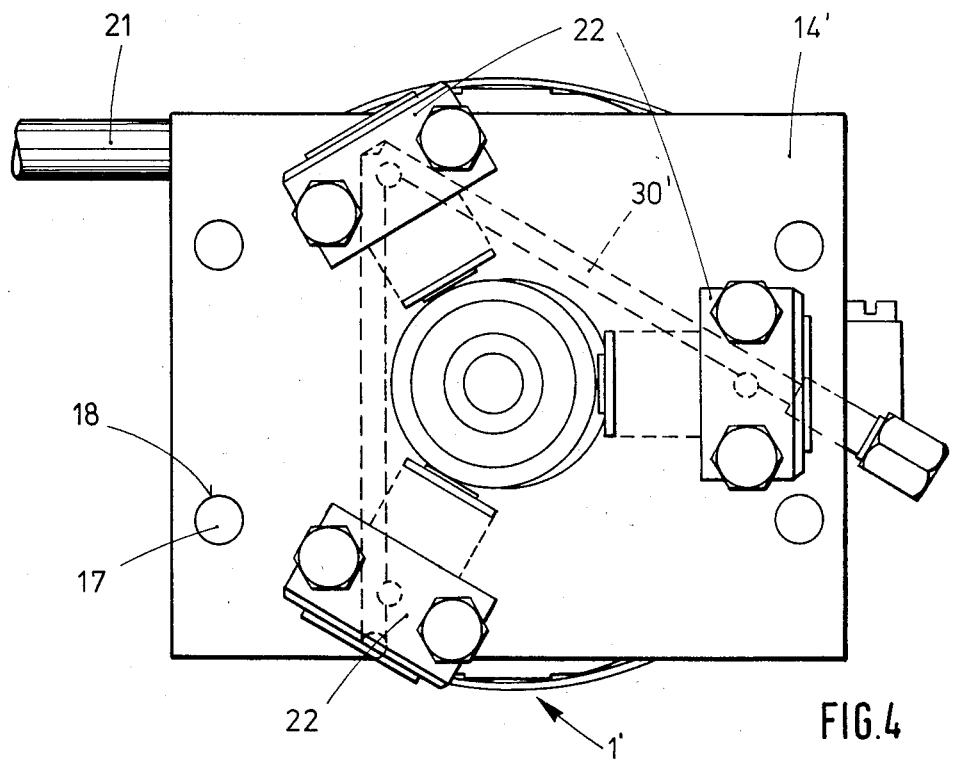
FIG. 4 is a bottom elevation of an embodiment comprising three pump elements, FIGS. 5a, b are two embodiments shown only in part in which the cover of the oil reservoir is formed by the plate of the rotor bearing.

FIG. 4 indicates yet another embodiment of a pump unit 1' in which three of the pump elements 22 are located on the underside of the plate 14'. They are mutually offset by 120° relative to the rolling bearing in each case. Appropriate channels 30' are provided within the plate 14' which collect and convey the hydraulic oil pumped by the pump elements 22.

The bars with a circular cross section may be replaced by other rigid elements for connecting the plates. The ends of these elements can also be secured in the plates in another manner, e.g. by screwing, so that the unit is easier to disassemble. The shape of the plates can also deviate from a rectangular configuration. Instead of only one tightening strap, a plurality can be provided adjacent to one another in large units.

In FIGS. 5a and 5b, the plate 13' simultaneously serves as the cover of the oil reservoir 2 by enlarging it and equipping it with a fastener wheel 32. The rolling bearing 11 for the rotor shaft 10 is sealed externally and is rendered dust- and soilproof by fixing on the stationary race either an annular seal 34, one sealing lip 35 of which is in contact with the other race, or a seal bonnet 36 featuring an insertable rim 37. The plate 13' is mounted on the rim of the oil reservoir by fastening means 33, for example.

Instead of the pump element 22 which operates with a plunger, another kind of hydraulic pump, e.g. a gear pump, can be attached to plate 14. The pump elements 12 or a gear pump can be mounted both on the lower and/or upper plate 13, 14. If the pump element 22 or a gear pump is provided on the upper plate 13, this is attached to the reservoir cover via spacer elements, for example. A lock means to prevent rotation can be provided between the outer stator circumference and the rods 17 or the tightening strap 19. For instance, two projections are provided in the stator which are adapted to clamp a rod 17 therebetween. Alternately, a projection is provided on the underside of the tightening strap 19 which engages a recess on the stator.

What is claimed is:

1. A hydraulic pump unit comprising a pump and including an electric motor for driving the pump, the stator of said motor being disposed in a housing defining an oil reservoir and the rotor of said motor being mounted on a rotor shaft which operates the pump, further comprising a pair of end shields respectively mounting a rotor shaft bearing opposite each end of said stator, said pump being supported by at least one such end shield, and further comprising elongated connecting members extending between said end shields substantially parallel to the axis of said shaft, characterized in that the connecting members are designed as rods

(17) distributed about the outer circumference (7) of said stator (5) and, when undeformed, guide the stator (5) on the outer circumference thereof (7) in a close sliding fit, and that a tightening strap (19) encompasses said rods (17) and the outer stator circumference (7), which strap deforms the rods (17) radially inward until said stator is fixed in a position by the strap pressing said rods against the stator circumference.

2. A pump unit according to claim 1, wherein said end shields (13,14) have a rectangular configuration and corners which project beyond the outer circumference of said stator (5), the ends of said rods being secured in openings (18) in the corners of said end shields.

3. A pump unit according to claims 1 or 2, characterized by said housing (2) being made of sheet metal and in which the pump unit is removably accommodated.

4. A pump unit according to claims 1 or 2, wherein one of said end shields (13) is adapted to be connected to a cover (3) for the oil reservoir (2).

5. A pump unit according to claims 1 or 2, wherein one of said end shields is designed as a cover for the oil reservoir and that a bearing (11) for the shaft (10) is mounted in said one end shield so as to have external sealing action.

6. A pump unit according to claim 5, wherein said bearing (11) is a roller bearing with a seal bonnet in the stationary bearing race thereof or an annular seal (34) with a circumferential sealing lip.

7. A pump unit according to claims 1 or 2, wherein a positive lock means is provided between the outer circumference of said stator and either the rods or said tightening strap (19) to prevent rotation of the stator.

* * * * *